United States Patent
Hajika et al.

(10) Patent No.: US 10,647,349 B2
(45) Date of Patent: May 12, 2020

(54) LANE DEVIATION PREVENTION CONTROL DEVICE FOR VEHICLE

(71) Applicant: SUBARU CORPORATION, Tokyo (JP)

(72) Inventors: Ryo Hajika, Tokyo (JP); Masahito Takizawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 77 days.

(21) Appl. No.: 16/156,848

(22) Filed: Oct. 10, 2018

(65) Prior Publication Data
US 2019/0202497 A1   Jul. 4, 2019

(30) Foreign Application Priority Data
Dec. 28, 2017 (JP) ................ 2017-253941

(51) Int. Cl.
| | | |
|---|---|---|
| *B62D 6/00* | (2006.01) | |
| *B62D 15/02* | (2006.01) | |
| *B62D 5/04* | (2006.01) | |
| *G05B 6/02* | (2006.01) | |
| *B62D 6/10* | (2006.01) | |

(52) U.S. Cl.
CPC .......... *B62D 6/005* (2013.01); *B62D 5/0463* (2013.01); *B62D 6/10* (2013.01); *B62D 15/025* (2013.01); *G05B 6/02* (2013.01); *B62D 5/0421* (2013.01)

(58) Field of Classification Search
None
See application file for complete search history.

(56) References Cited

U.S. PATENT DOCUMENTS

| | | | | |
|---|---|---|---|---|
| 2,877,967 | A * | 3/1959 | Markusen | G05D 1/0202 244/185 |
| 4,031,527 | A * | 6/1977 | Yanagishima | B60K 28/06 340/576 |
| 6,577,948 | B1 * | 6/2003 | Skellenger | G01C 21/26 303/140 |
| 2002/0042671 | A1 * | 4/2002 | Chen | B60K 28/16 701/41 |

(Continued)

FOREIGN PATENT DOCUMENTS

| | | |
|---|---|---|
| JP | 2004-070853 A | 3/2004 |
| JP | 2005-165743 A | 6/2005 |

(Continued)

OTHER PUBLICATIONS

Japanese Notice of Reasons for Refusal issued in corresponding Japanese Patent Application No. 2017-253941, dated Oct. 1, 2019, with English translation.

*Primary Examiner* — Shelley Chen
(74) *Attorney, Agent, or Firm* — McDermott Will & Emery LLP (57) ABSTRACT

A lane deviation prevention control device for a vehicle includes a target yaw rate calculator, a target steering torque calculator, and an integration permission determiner. The integration permission determiner determines, on the basis of a state of an own vehicle with respect to a lane and on the basis of a state of an actual yaw rate with respect to a target yaw rate, whether or not to permit an integral control in a proportional integral differential control, in executing a feedback control on the target yaw rate by the proportional integral differential control.

6 Claims, 6 Drawing Sheets

(56) References Cited

U.S. PATENT DOCUMENTS

| | | | |
|---|---|---|---|
| 2003/0023359 A1* | 1/2003 | Kueblbeck | B60R 21/013 |
| | | | 701/45 |
| 2005/0125125 A1 | 6/2005 | Matsumoto et al. | |
| 2009/0088926 A1* | 4/2009 | Yamashita | G01B 21/22 |
| | | | 701/41 |
| 2011/0238252 A1* | 9/2011 | Takeda | B60W 40/072 |
| | | | 701/31.4 |
| 2014/0067205 A1 | 3/2014 | You et al. | |
| 2015/0246687 A1* | 9/2015 | Takeda | B62D 6/002 |
| | | | 701/41 |
| 2015/0274206 A1* | 10/2015 | Takeda | B62D 6/008 |
| | | | 701/41 |
| 2016/0280262 A1* | 9/2016 | Oyama | G05D 1/02 |
| 2017/0113546 A1* | 4/2017 | Maeda | B60K 23/04 |
| 2018/0057054 A1* | 3/2018 | Tokoro | B60K 31/0008 |
| 2018/0202804 A1* | 7/2018 | Dumble | G01B 21/24 |

FOREIGN PATENT DOCUMENTS

| | | |
|---|---|---|
| JP | 2005-343260 A | 12/2005 |
| JP | 2007-145227 A | 6/2007 |
| JP | 2016-064799 A | 4/2016 |
| JP | 2016-175571 A | 10/2016 |

\* cited by examiner

LANE DEVIATION PREVENTION CONTROL DEVICE FOR VEHICLE

CROSS-REFERENCE TO RELATED APPLICATIONS

The present application claims priority from Japanese Patent Application No. 2017-253941 filed on Dec. 28, 2017, the entire contents of which are hereby incorporated by reference.

BACKGROUND

The technology relates to a lane deviation prevention control device for a vehicle that executes a lane deviation prevention control including preventing the vehicle from deviating from its traveling lane.

Regarding vehicles, e.g., automobiles, there has been known a technique of a lane deviation prevention control. In a case where current behavior of a vehicle is estimated to cause lane deviation, a control instruction is outputted to a steering device such as an electric power steering (EPS) device, to prevent the own vehicle from deviating outwardly from its traveling lane. For example, reference can be made to Japanese Unexamined Patent Application Publication (JP-A) No. 2016-64799.

SUMMARY

An aspect of the technology provides a lane deviation prevention control device for a vehicle. The lane deviation prevention control device includes a target yaw rate calculator, a target steering torque calculator, and an integration permission determiner. The target yaw rate calculator is configured to calculate a target yaw rate in a lane deviation prevention control. The lane deviation prevention control includes preventing an own vehicle from deviating from a lane on which the own vehicle is traveling. The target steering torque calculator is configured to calculate target steering torque to be applied to a steering system of the own vehicle, by a feedback control based on at least a deviation between the target yaw rate and an actual yaw rate. The integration permission determiner is configured to determine, on the basis of a state of the own vehicle with respect to the lane and on the basis of a state of the actual yaw rate with respect to the target yaw rate, whether or not to permit an integral control in a proportional integral differential control, in executing the feedback control on the target yaw rate by the proportional integral differential control.

An aspect of the technology provides a lane deviation prevention control device for a vehicle. The lane deviation prevention control device includes circuitry. The circuitry is configured to calculate a target yaw rate in a lane deviation prevention control. The lane deviation prevention control includes preventing an own vehicle from deviating from a lane on which the own vehicle is traveling. The circuitry is configured to calculate target steering torque to be applied to a steering system of the own vehicle, by a feedback control based on at least a deviation between the target yaw rate and an actual yaw rate. The circuitry is configured to determine, on the basis of a state of the own vehicle with respect to the lane and on the basis of a state of the actual yaw rate with respect to the target yaw rate, whether or not to permit an integral control in a proportional integral differential control, in executing the feedback control on the target yaw rate by the proportional integral differential control.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same numerals to avoid redundant description.

In general, a lane deviation prevention control includes performing a deviation suppression control at an early stage of the control. The deviation suppression control includes suppressing an own vehicle from deviating from a lane line as a target of deviation prevention, to control the own vehicle to be directed inwardly of a lane. After the own vehicle is directed substantially parallel to the target lane line, a posture decision control is executed. The posture decision control includes controlling a posture of the own vehicle to be directed appropriately with respect to a target course inside the lane. These controls include, at least, a feedback control. As the feedback control, adopted is a proportional integral differential control based on a deviation between a target yaw rate and an actual yaw rate.

In the posture decision control, the own vehicle is no longer directed in a direction of deviation with respect to the target lane line. However, in the posture decision control, there is possibility of delay in turn-back steering, in a case where the actual yaw rate overshoots the target yaw rate inwardly of the lane, because of an amount of integration that has been integrated during the previous deviation suppression control. This causes possibility of involute behavior that may induce deviation from an opposite lane line to the target lane line.

A possible action to be taken in this case is to stop an integral control in the posture decision control. However, in case of any disturbance, stopping the integral control in the posture decision control may cause difficulty in eliminating influences of the disturbance, and in allowing the own vehicle to follow the target yaw rate. This may result in re-deviation from the target lane line from which deviation has been prevented by the previous deviation suppression control. Examples of the disturbance may include a change in a lane curvature, a change in a transverse gradient of a road, and a driver's steering operation.

It is desirable to provide a lane deviation prevention control device for a vehicle that makes it possible to prevent deviating behavior from an opposite lane line to a lane line as a target of deviation prevention, in controlling a posture of an own vehicle in a lane deviation prevention control. Moreover, it is desirable to provide a lane deviation control device for a vehicle that makes it possible to prevent re-deviation from the lane line as the target of deviation prevention.

Figure 1:
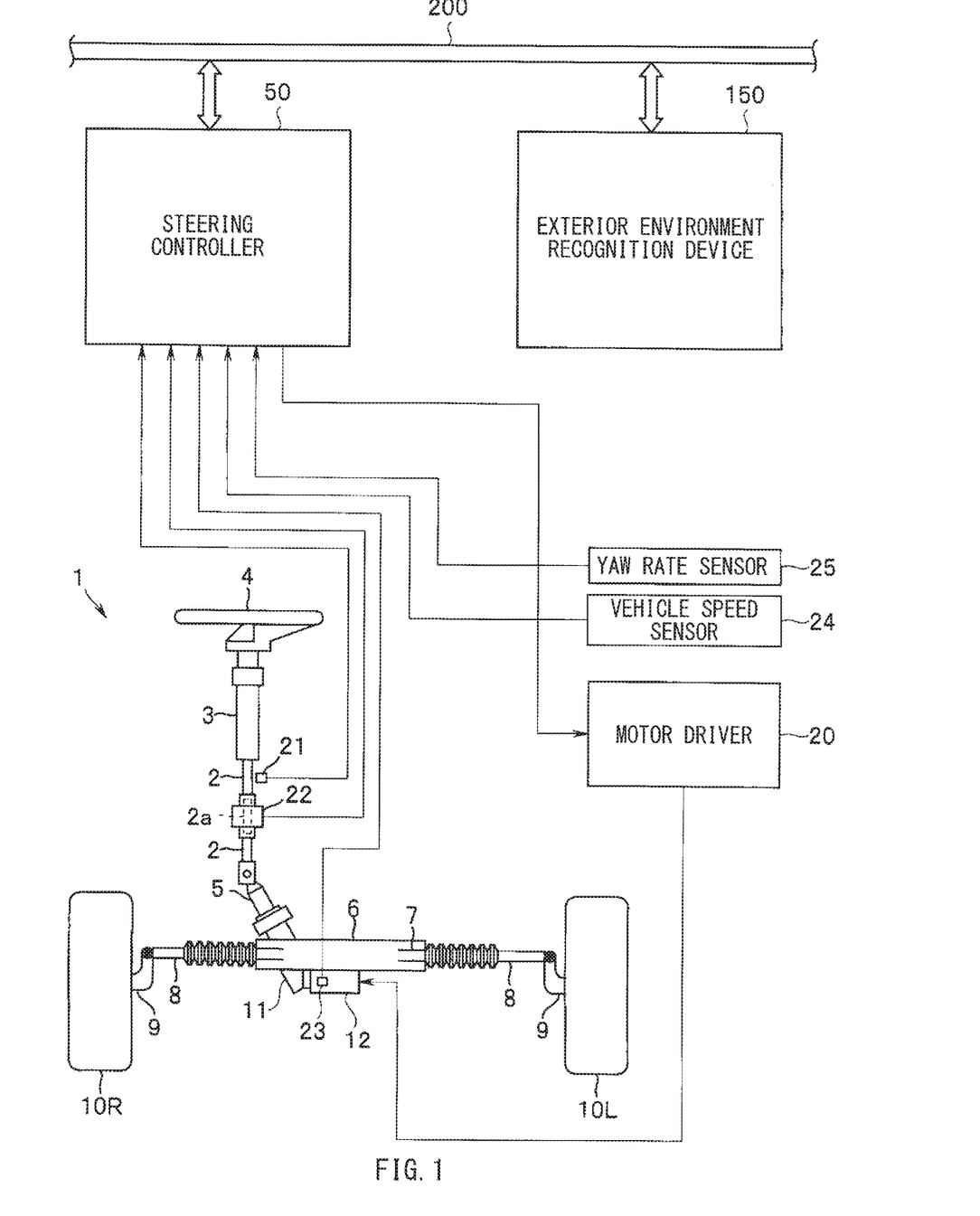
FIG. 1 is a diagram illustrating an example of a configuration of a vehicle steering system.

FIG. 1 illustrates an electronic power steering (EPS) device 1. The EPS device 1 may serve as a steering device that is able to control a steering angle through an actuator, independently of a driver's steering operation. In the EPS device 1, a steering shaft 2 may be rotatably supported, through a steering column 3, by an undepicted chassis of a vehicle, e.g., an automobile.

One end of the steering shaft 2 may be extended toward a driver's seat, while another end of the steering shaft 2 may be extended toward an engine room. A steering wheel 4 may be fixed to the end of the steering shaft 2 on side on which the driver's seat is disposed. A steering angle sensor 21 may be disposed on outer circumferential side of the steering shaft 2 to which the steering wheel 4 is coupled.

The steering angle sensor 21 may include, for example, two pairs of magnetoresistive elements, in its inside. The magnetoresistive elements may detect rotation of a magnet incorporated in a sensing gear. The steering angle sensor 21 may set in advance a reference rotation position of the steering wheel 4. The reference rotation position may be, for example, a rotation position of an upper part of the steering wheel 4 in a straight traveling state of the vehicle. Thus, the steering angle sensor 21 may be able to detect, on the basis of a variation in magnetism caused by rotation of the sensing gear, a rotation angle, i.e., a steering angle, and a rotation direction, i.e., a steering direction, from the fixed reference position set in advance.

A torsion bar 2a may be disposed in the middle of the steering shaft 2. A pinion shaft 5 may be coupled to the end of the steering shaft 2 extended toward the engine room. A torque sensor 22 may be disposed on outer circumferential side of the torsion bar 2a. The torque sensor 22 may detect dislocation caused by torsion of the torsion bar 2a. The dislocation is generated circumferentially around the steering shaft 2, between side on which the steering wheel 4 is disposed and side on which the pinion shaft 5 is disposed. Thus, the torque sensor 22 may be able to detect the driver's steering torque produced by the driver's steering operation.

A steering gear box 6 may be disposed inside the engine room. The steering gear box 6 may extend in a vehicle widthwise direction. A rack shaft 7 may be reciprocatably inserted in and supported by the steering gear box 6. The rack shaft 7 may include undepicted racks. The racks may be engaged with pinions formed on the pinion shaft 5, to form a rack-and-pinion steering mechanism.

Right and left ends of the rack shaft 7 may be protruded from respective ends of the steering gear box 6. To the protruded ends of the rack shaft 7, coupled may be front knuckles 9, through tie rods 8. The front knuckles 9 may rotatably support right and left wheels 10R and 10L as steering wheels. The front knuckles 9 may be steerably supported by the chassis. Operating the steering wheel 4 causes rotation of the steering shaft 2 and the pinion shaft 5. The rotation of the pinion shaft 5 causes rightward or leftward movement of the rack shaft 7. The movement causes the front knuckles 9 to rotate around an undepicted king pin shaft as a center, causing the right and left wheels 10R and 10L to be steered rightward or leftward.

An electric power steering (EPS) motor 12 may be coupled to the pinion shaft 5 through an assistant transmission mechanism 11. The EPS motor 12 may serve as an actuator that allows for assistance with the driver's steering operation and automatic steering. The assistant transmission mechanism 11 may include a reduction gear mechanism such as worm gears. The EPS motor 12 may be, for example, an electric motor constituted by a direct current (DC) brushless motor including a stator and a rotor. The stator may be fixed to a case. The rotor may rotate inside the stator. The rotation of the rotor of the electric motor is converted, through the assistant transmission mechanism 11, into axial movement of the rack shaft 7.

A rotation angle sensor 23 may be incorporated in the EPS motor 12. The rotation angle sensor 23 may detect a rotation angle of the rotor. The rotation angle sensor 23 may be, for example, a sensor that detects a relative rotation angle of the rotor to a predetermined zero point position by, for example, a rotary encoder. A signal from the rotation angle sensor 23 may be supplied to the steering controller 50.

It is to be noted that in the rotation angle sensor 23, initial setting of the zero point position may be provided, for example, when an ignition switch is turned to an 'ON' position. The initial setting may be based on the steering angle detected by the steering angle sensor 21 and based on a reduction ratio of the assistant transmission mechanism 11. Normally, the rotation angle detected by the rotation angle sensor 23 and the rotation angle of the steering wheel 4 detected by the steering angle sensor 21 may be dealt as the same steering angle.

The steering controller 50 may be a control unit that includes a microcomputer as its main component. The microcomputer may include, for example, a central processing unit (CPU), a read only memory (ROM) that stores, for example, programs, and a random access memory (RAM) that serves as a work area. The steering controller 50 may perform a drive control of the EPS motor 12 through the motor driver 20. The steering controller 50 may be supplied with signals from sensors and undepicted switches. Non-limiting examples of the sensors may include the steering angle sensor 21, the torque sensor 22, the rotation angle sensor 23, and other sensors including a vehicle speed sensor 24 and a yaw rate sensor 25. The vehicle speed sensor 24 may detect a vehicle speed. The yaw rate sensor 25 may detect a yaw rate, i.e., a rotation speed of the vehicle around a vertical axis.

The steering controller 50 may be coupled to a communication bus 200 that forms an in-vehicle network. To the communication bus 200, coupled may be an exterior environment recognition device 150 that recognizes exterior environment of the vehicle, to acquire travel environment information. Other undepicted controllers may be also coupled to the communication bus 200. Non-limiting examples may include an engine controller, a transmission controller, and a brake controller. The controllers are able to transmit and receive control information to and from one another through the communication bus 200.

The exterior environment recognition device 150 may recognize the exterior environment around the own vehicle on the basis of, for example, detection information of objects around the own vehicle, traffic information, positioning information of a position of the own vehicle, and high definition map information. The detection information may be acquired by various devices such as a camera and millimeter wave radar for forward recognition, and a side camera and sideward radar for sideward recognition. The traffic information may be acquired by infrastructure communication such as road-vehicle communication and inter-vehicle communication. The positioning information may be based on signals from, for example, global positioning satellites (GPS). The high definition map information may include road shape data and data for a travel control. Non-limiting examples of the road shape data may include a curvature, a lane width, and a road shoulder width of a road. Non-limiting examples of the data for the travel control may include a road azimuth angle, categories of lane lines, and the number of lanes.

In this implementation, the exterior environment recognition device 150 may mainly perform recognition of forward environment of the own vehicle. The recognition of the forward environment may be made by an on-vehicle camera and an image recognition unit. As the camera for the forward recognition, used may be a stereo camera including two cameras that capture images of an identical object from different points of view. The two cameras that constitute the stereo camera may be a shutter synchronous camera including imaging elements such as charge coupled device (CCD) and complementary metal oxide semiconductor (CMOS). The two cameras may be disposed, for example, in the vicinity of a rearview mirror inside a front windshield in an upper part of a vehicle cabin, with a predetermined baseline length.

Processing on image data from the stereo camera may be carried out, for example, as follows. First, a distance image may be generated, on the basis of an amount of dislocation between corresponding positions, in a pair of stereo images in a traveling direction of the own vehicle captured by the stereo camera. The distance image may have distance information. With the use of the distance information of the distance image, recognition of lane lines and recognition processing of three-dimensional objects may be carried out. Non-limiting examples of the lane lines may include white lane lines and other kinds of lane lines. Non-limiting examples of the three-dimensional objects may include preceding vehicles and oncoming vehicles.

In the recognition of the lane lines such as the white lane lines, changes in luminance of a road in a widthwise direction may be evaluated on the basis of knowledge that the lane lines are higher in luminance than a road surface. Thus, positions of right and left lane lines on an image plane may be identified on the image plane. A position (x, y, z) of the lane line in actual space may be calculated by a known coordinate conversion expression, on the basis of the distance information, i.e., on the basis of a position (i, j) on the image plane and parallax calculated regarding the relevant position (i, j).

A coordinate system in the actual space may be set, with reference to the position of the own vehicle. In this implementation, as illustrated in, for example, FIG. 3, the coordinate system in the actual space may have the road surface directly below the camera as an origin, the vehicle widthwise direction as an x axis, a vehicle heightwise direction as a y axis, and a vehicle lengthwise direction, i.e., a direction of distance, as a z axis. At this occasion, an x-z plane (y=0) may coincide with the road surface, in a case where the road is flat. A road model may be represented, by dividing a traveling lane of the own vehicle on the road into a plurality of sections, approximating right and left lane lines in each section as predetermined, and coupling the approximated right and left lane lines to one another.

Figure 3:
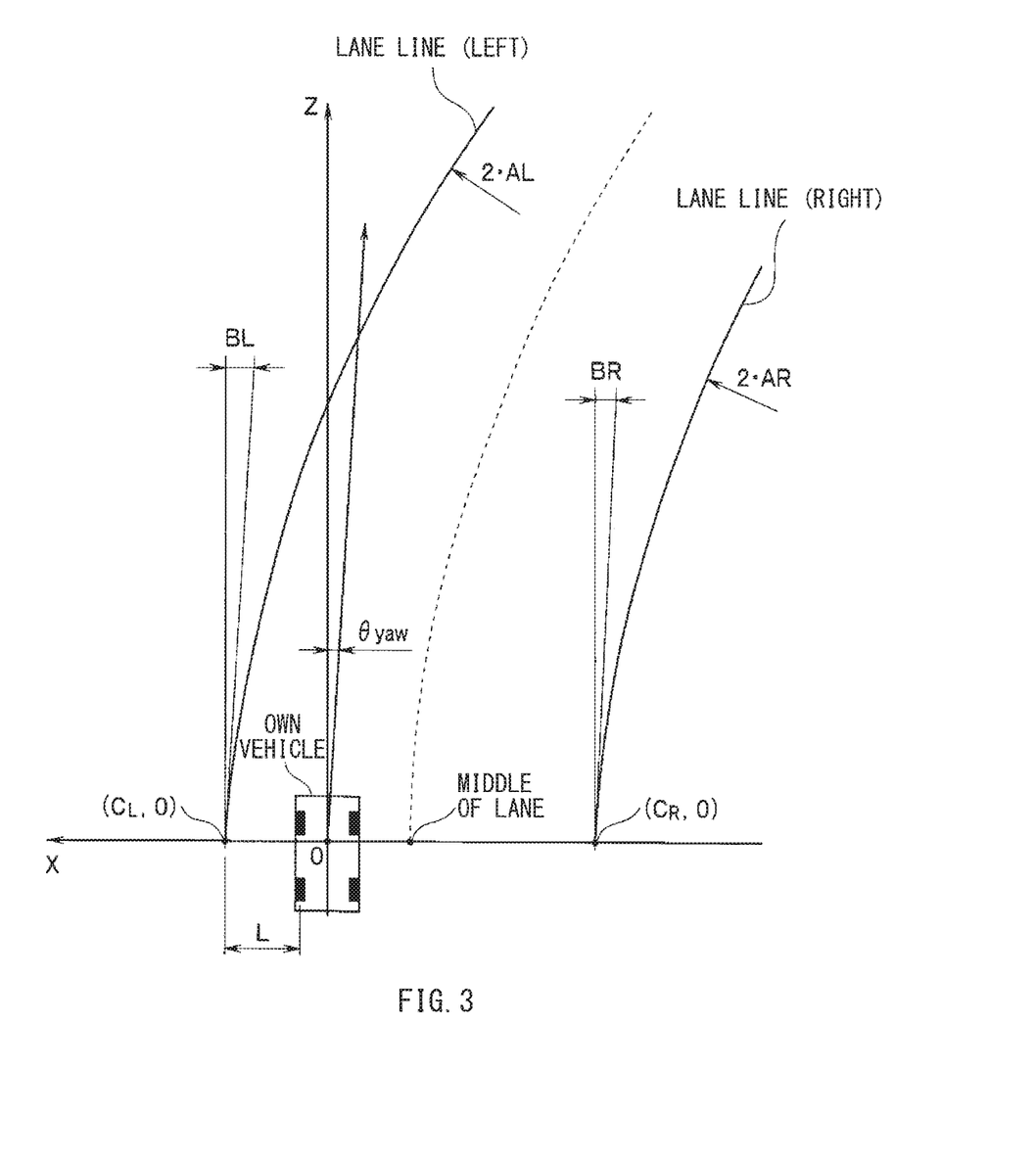
FIG. 3 is a diagram describing an own vehicle and a lane, together with various parameters.

For the approximation processing of the right and left lane lines, adopted may be, for example, approximation processing of the lane lines by a least square method. In one specific but non-limiting example, the lane line on left side of the own vehicle may be approximated by the least square method, as given by the following expression (1). The lane line on right side of the own vehicle may be approximated by the least square method, as given by the following expression (2).

$$x = AL \cdot z^2 + BL \cdot z + CL \tag{1}$$

$$x = AR \cdot z^2 + BR \cdot z + CR \tag{2}$$

In the expressions (1) and (2) given above, "AL" and "AR" denote curvatures of respective curves. A curvature κL of the lane line on the left side may be 2·AL. A curvature κR of the lane line on the right side may be 2·AR. Thus, a lane curvature κ may be represented by the following expression (3).

$$\kappa = (2 \cdot AL + 2 \cdot AR)/2 = AL + AR \tag{3}$$

In the expressions (1) and (2), "BL" and "BR" denote inclinations of the respective curves in the widthwise direction of the own vehicle. "CL" and "CR" denote positions of the respective curves in the widthwise direction of the own vehicle. Refer to FIG. 3.

The exterior environment recognition device 150 may further calculate a relative-to-lane yaw angle θyaw of the own vehicle, by the following expression (4).

$$\theta yaw = \tan^{-1}((BL + BR)/2) \tag{4}$$

A recognition result of the exterior environment by the exterior environment recognition device 150 may be transmitted to the steering controller 50 and other controllers. The steering controller 50 may perform a driver assistance control that includes automatic driving of the own vehicle and assisting the driver with driving. In the driver assistance control, the steering controller 50 may set a target course to be traveled by the own vehicle, from the recognition result of the exterior environment. The steering controller 50 may execute a steering assistance control, through the motor driver 20 that drives the EPS motor 12, to allow the own vehicle to travel to follow the target course. In a case with detection of steering interference by the driver's steering operation, the steering controller 50 may allow the EPS motor 12 to output assistive torque that assists the driver with the steering operation.

The target course in a steering control by the steering controller 50 may be set on the basis of the recognition result of the exterior environment by the exterior environment recognition device 150. For example, in a lane keeping control that includes allowing the own vehicle to follow a lane and keeping the own vehicle in the middle of the lane, the middle position between the right and left lane lines in a road widthwise direction may be set as the target course. The steering controller 50 may set a target steering angle that allows a middle position of the own vehicle in the vehicle widthwise direction to coincide with the target course. The steering controller 50 may control a drive current of the EPS motor 12, to allow the steering angle of the steering control to coincide with the target steering angle. It is to be noted that the target course may be set by other controllers than the steering controller 50, e.g., the exterior environment recognition device 150.

The steering controller 50 may execute not only the lane keeping control but also a lane deviation prevention control. The lane keeping control may include keeping the own vehicle in the middle of the lane. The lane deviation prevention control may include preventing the own vehicle from deviating from the lane. In one specific but non-limiting example, the steering controller 50 may calculate lane deviation estimated time Ttlc, in a case where the relative-to-lane yaw angle of the own vehicle is directed toward a direction of deviation, on the basis of information from the exterior environment recognition device 150 and on the basis of driving states of the own vehicle. The lane deviation estimated time Ttlc refers to time it takes for the own vehicle to stride over a lane line on deviation side on which deviation is to be expected. In a case where the lane deviation estimated time Ttlc is equal to or smaller than a threshold Tth, the steering controller 50 may start the lane deviation prevention control. The threshold Tth may be decided by the vehicle speed V of the own vehicle and the lane curvature κ.

The lane deviation estimated time Ttlc may be obtained by dividing a distance L from the own vehicle to the lane line on the deviation side by a speed component of the vehicle speed V of the own vehicle corresponding to the relative-to-lane yaw angle θyaw, as represented by the following expression (5).

$$\text{Ttlc} = L/(V \cdot \sin\theta\text{yaw}) \tag{5}$$

The lane deviation prevention control may include calculating target steering torque Tp, by a feedforward control and a feedback control on a target yaw rate γtgt.

The target steering torque Tp is to be applied to a steering system of the own vehicle, to achieve the target yaw rate γtgt that allows the own vehicle to travel along the target course. The feedback control for the target steering torque Tp may be, basically, executed as a proportional integral differential (PID) control based on a deviation between the target yaw rate γtgt and an actual yaw rate γ. As used herein, a steering system refers to an arrangement from the steering wheel 4 to the steering wheels through the steering mechanism.

In this case, the lane deviation prevention control may be, specifically, divided into a deviation suppression control and a posture decision control. The deviation suppression control may include generating deviation-suppressing behavior in the own vehicle, at a start of the control, with the yaw angle of the own vehicle being directed in the direction of deviation with respect to a direction of extension of the lane (relative-to-lane yaw angle θyaw>0). The posture decision control may include controlling the posture of the own vehicle after the own vehicle becomes substantially parallel to the direction of extension of the lane until an arrival at a location of an end of the control (relative-to-lane yaw angle θyaw<0). Being substantially parallel to the direction of extension of the lane means that, for example, the own vehicle is substantially parallel to the lane line on the deviation side. After a transition from the deviation suppression control to the posture decision control, there is possibility of lowered followingness to the target yaw rate, because of the amount of integration that has been integrated during the deviation suppression control.

Figure 2:
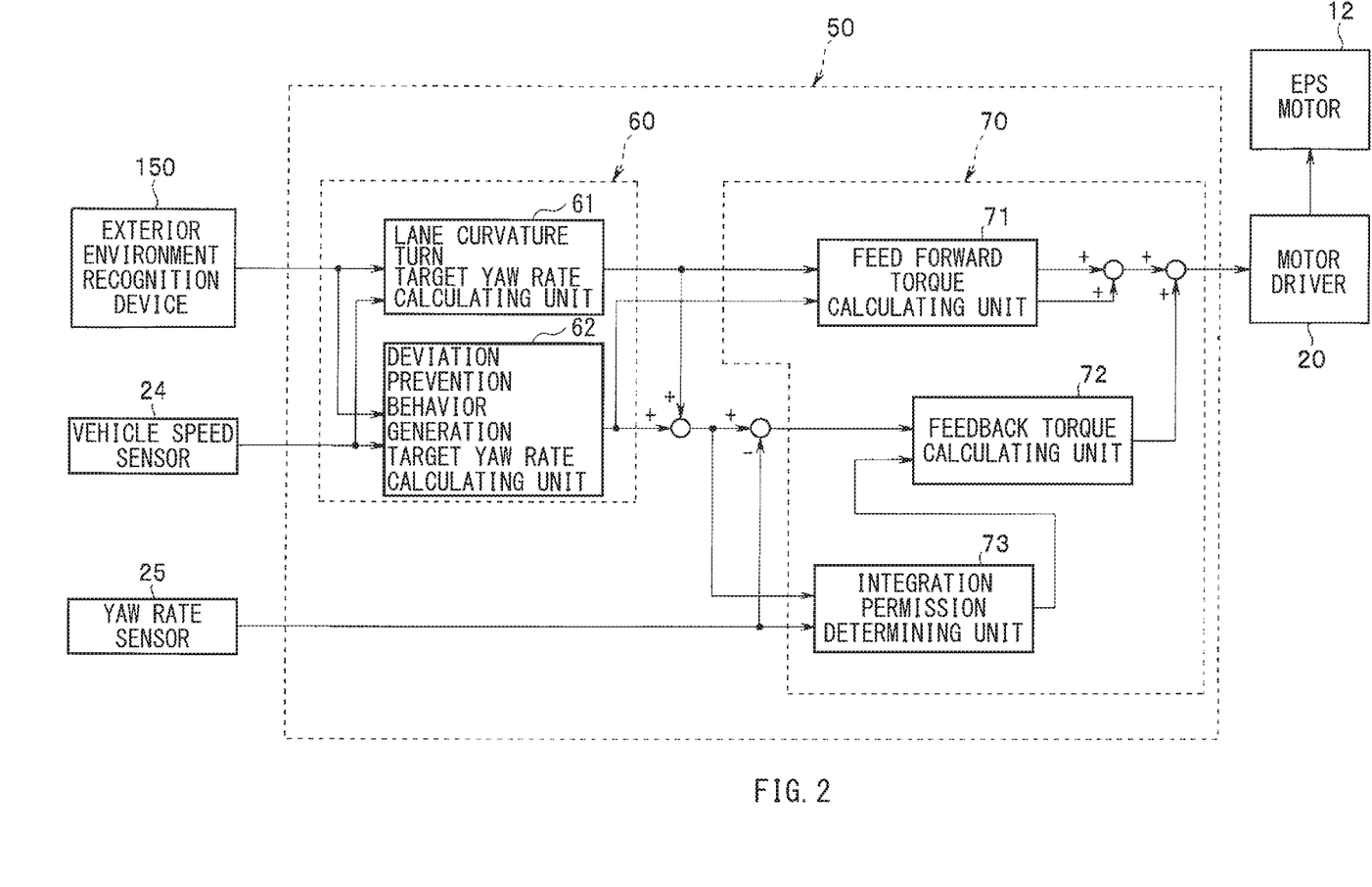
FIG. 2 is a block diagram illustrating an example of functions of a steering control system.

Thus, as illustrated in FIG. 2, the steering controller 50 may include, as its main configuration, a target yaw rate calculating unit 60 and a target steering torque calculating unit 70. The target yaw rate calculating unit 60 may calculate the target yaw rate. The target steering torque calculating unit 70 may calculate the target steering torque. The steering controller 50 may allow the target steering torque calculating unit 70 to determine whether or not to permit an integral control in the PID control, to make a switchover between the PID control and a proportional differential (PD) control. The target yaw rate calculating unit 60 and the target steering torque calculating unit 70 may serve as functional units related to the lane deviation prevention control.

In one specific but non-limiting example, the target yaw rate calculating unit 60 may include a lane curvature turn target yaw rate calculating unit 61, and a deviation prevention behavior generation target yaw rate calculating unit 62. The lane curvature turn target yaw rate calculating unit 61 may calculate a lane curvature turn target yaw rate γtgt_lane that serves as a target amount of turn in accordance with the lane curvature. The deviation prevention behavior generation target yaw rate calculating unit 62 may calculate a deviation prevention behavior generation target yaw rate γtgt_turn that serves as a target amount of turn that prevents lane deviation.

The lane curvature turn target yaw rate γtgt_lane and the deviation prevention behavior generation target yaw rate γtgt_turn may be added together to calculate the final target yaw rate γtgt, as represented by the following expression (6).

$$\gamma\text{tgt} = \gamma\text{tgt\_lane} + \gamma\text{tgt\_turn} \tag{6}$$

The lane curvature turn target yaw rate calculating unit 61 may calculate the lane curvature turn target yaw rate γtgt_lane, with the vehicle speed V of the own vehicle and the lane curvature κ, as represented by the following expression (7).

$$\gamma\text{tgt\_lane} = \kappa \cdot V \tag{7}$$

It is to be noted that as to the yaw rate and the curvature, a positive sign is assumed to represent a left turn. As to the relative-to-lane yaw angle, a positive sign is assumed to represent the direction of deviation from the lane line on the left side. As to the lateral position, a positive sign is assumed to represent inside the lane.

The deviation prevention behavior generation target yaw rate calculating unit 62 may calculate a target yaw rate γtgt_turn_1 in the deviation suppression control (relative-to-lane yaw angle θyaw>0) and a target yaw rate γtgt_turn_2 in the posture decision control (relative-to-lane yaw angle θyaw<0). The target yaw rates γtgt_turn_1 and γtgt_turn_2 may be switched in accordance with the relative-to-lane yaw angle and the lateral position of the own vehicle. Thus, either one of them may be outputted as the deviation prevention behavior generation target yaw rate γtgt_turn.

The target yaw rate γtgt_turn_1 during the deviation suppression control may be calculated on the basis of the relative-to-lane yaw angle θyaw and the lane deviation estimated time Ttlc, as represented by the following expression (8).

$$\gamma\text{tgt\_turn\_1} = \theta\text{yaw}/\text{Ttlc} \tag{8}$$

The target yaw rate γtgt_turn_2 during the posture decision control may be calculated by dividing, by target time Ttgt, a value obtained by multiplying, by a predetermined feedback gain Kyawfb, a deviation between a target relative-to-lane yaw angle θtgt_yaw at the end of the control and the relative-to-lane yaw angle θyaw during the posture decision control, as represented by the following expression (9). The target time Ttgt is time it takes to reach the target relative-to-lane yaw angle θtgt_yaw.

$$\gamma\text{tgt\_turn\_2} = -K\text{yawfb} \cdot (\theta\text{tgt\_yaw} - \theta\text{yaw})/\text{Ttgt} \tag{9}$$

The target steering torque calculating unit 70 may include a feedforward torque calculating unit 71 and a feedback torque calculating unit 72. The feedforward torque calculating unit 71 may calculate feedforward torque by the feedforward control. The feedback torque calculating unit 72 may calculate feedback torque by the PID control. The target steering torque calculating unit 70 may further include an integration permission determining unit 73 that determines whether or not to permit the integral control in the PID control of the feedback torque. As described below, the feedforward torque and the feedback torque may be added together to obtain the target steering torque.

The feedforward torque calculating unit 71 may calculate feedforward torque Tp_ff_lane that generates the lane curvature turn target yaw rate γtgt_lane. The feedforward torque calculating unit 71 may also calculate feedforward torque Tp_ff_turn that generates the deviation prevention behavior generation target yaw rate γtgt_turn.

The feedforward torque Tp_ff_lane and Tp_ff_turn may be calculated with the use of a torque conversion gain Kyawr_to_trq. The torque conversion gain Kyawr_to_trq may be obtained by referring to a map of the yaw rate and the torque conversion gain. The map may be created in advance. In other words, as represented by the following expression (10), the feedforward torque Tp_ff_lane may be calculated by multiplying the lane curvature turn target yaw rate γtgt_lane by the torque conversion gain Kyawr_to_trq. As represented by the following expression (11), the feedforward torque Tp_ff_turn may be calculated by multiplying the deviation prevention behavior generation target yaw rate γtgt_turn by the torque conversion gain Kyawr_to_trq.

$$Tp\_ff\_lane = Kyawr\_to\_trq \cdot \gamma tgt\_lane \quad (10)$$

$$Tp\_ff\_turn = Kyawr\_to\_trq \cdot \gamma tgt\_turn \quad (11)$$

The feedback torque calculating unit 72 may calculate feedback torque Tp_fb based on the deviation between the target yaw rate γtgt and the actual yaw rate γ of the own vehicle detected by the yaw rate sensor 25. The feedback torque Tp_fb may be obtained, during the deviation suppression control, by the PID control on the deviation (γtgt−γ) between the target yaw rate γtgt and the actual yaw rate γ, as represented by the following expression (12). A proportional gain Kp, an integral gain Ki, and a differential gain Kd of the PID control may be set in accordance with characteristics optimally set in advance.

$$Tp\_fb = Kp \cdot (\gamma tgt - \gamma) + Ki \cdot \int (\gamma tgt - \gamma) dt + Kd \cdot d(\gamma tgt - \gamma)/dt \quad (12)$$

Upon the transition from the deviation suppression control to the posture decision control, the integration permission determining unit 73 may determine whether or not to permit the integral control in the PID control. In a case where a determination has been made that the integral control is not to be permitted, the feedback torque Tp_fb may be calculated by the PD control on the deviation (γtgt−γ) between the target yaw rate γtgt and the actual yaw rate γ, as represented by the following expression (13).

$$Tp\_fb = Kp \cdot (\gamma tgt - \gamma) + Kd \cdot d(\gamma tgt - \gamma)/dt \quad (13)$$

The feedforward torque Tp_ff_lane and Tp_ff_turn from the feedforward torque calculating unit 71, and the feedback torque Tp_fb from the feedback torque calculating unit 72 may be added together, as represented by the following expression (14), to calculate the target steering torque Tp.

$$Tp = Tp\_ff\_lane + Tp\_ff\_turn + Tp\_fb \quad (14)$$

The integration permission determining unit 73 determines, on the basis of the state of the own vehicle with respect to the lane and on the basis of the state of the actual yaw rate with respect to the target yaw rate, whether or not to permit the integral control in the PID control of the feedback torque calculating unit 72. In one specific but non-limiting example, the integration permission determining unit 73 may determine that the integral control is to be permitted, during the deviation suppression control after the start of the control as to the lane deviation prevention control until the own vehicle becomes substantially parallel to the lane line on the deviation side. Thus, the integration permission determining unit 73 may cause the feedback torque Tp_fb to be calculated by the PID control, as given by the expression (12).

The own vehicle becomes substantially parallel to the lane line on the deviation side, causing the transition from the deviation suppression control to the posture decision control. Upon the transition, the integration permission determining unit 73 may determine that the integral control is not to be permitted, causing a stop of the integral control. Thus, the integration permission determining unit 73 may cause the feedback torque Tp_fb to be calculated by the PD control, as given by the expression (13). Upon the stop of the integral control, the integration permission determining unit 73 may reset the amount of integration at zero (0), to initialize the amount of integration. The amount of integration has been integrated on each control cycle. Thereafter, in a case where the actual yaw rate makes a transition toward the deviation side with respect to the target yaw rate, the integration permission determining unit 73 may start integration of the amount of integration, to restore the PID control.

Figure 4:
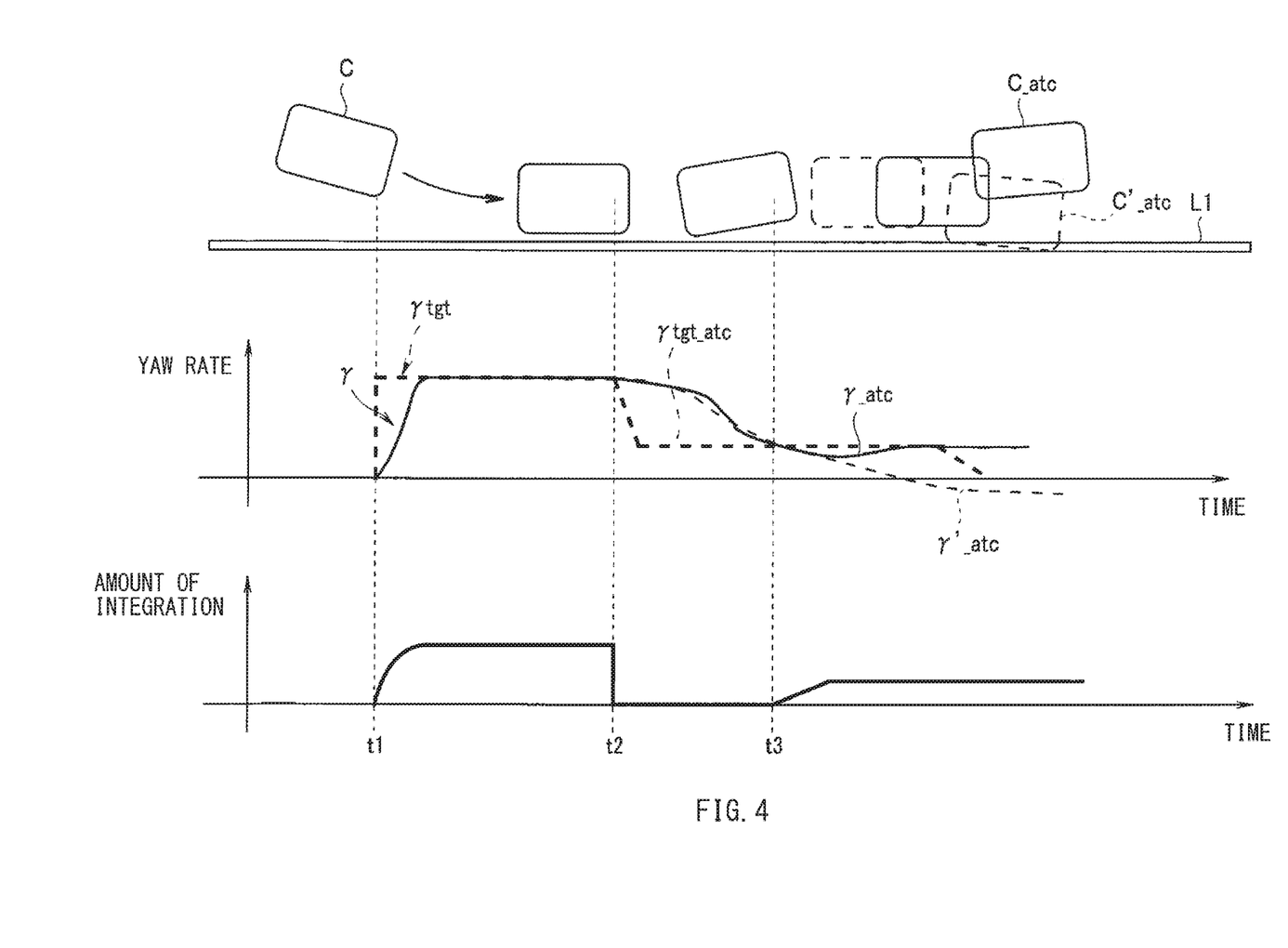
FIG. 4 is a diagram illustrating vehicle behavior during a lane deviation prevention control.

Specifically, as illustrated in FIG. 4, a determination may be made that an own vehicle C is directed toward the direction of deviation with respect to a lane line L1, causing possibility of lane deviation. Thus, at time t1, the deviation suppression control may be started. Upon the start of the deviation suppression control, the target yaw rate γtgt may be set, and the PID control on the target yaw rate γtgt may be executed. The target yaw rate γtgt may provide an amount of turn that suppresses deviation from the lane line L1. In the PID control, a difference between the target yaw rate γtgt and the actual yaw rate γ may be added and integrated on each control cycle.

By the deviation suppression control, the direction of the own vehicle C is corrected, causing the actual yaw rate γ to converge on the target yaw rate γtgt, and causing the amount of integration to be constant. At time t2, the own vehicle C becomes substantially parallel to the lane line L1, causing the transition from the deviation suppression control to the posture decision control. Upon the transition, the target yaw rate γtgt may be reset at a relatively low target yaw rate γtgt_atc. Simultaneously, the amount of integration may be reset at zero (0) and be initialized. The integration of the amount of integration may be stopped. Thus, a switchover may be made from the PID control on the target yaw rate γtgt to the PD control on the target yaw rate γtgt_atc.

Resetting the amount of integration and stopping the integration makes it possible to execute the turn-back steering without delay, in a case where the actual yaw rate overshoots inwardly of the lane with respect to the target yaw rate γtgt_atc of which an amount of turn in an inward direction of the lane has been decreased as compared to that during the deviation suppression control. As a result, it is possible to prevent involute behavior that may induce deviation from an opposite lane line to the lane line L1.

After the posture decision control brings the posture of the own vehicle C to the inward direction of the lane line L1, the transition of the actual yaw rate toward the deviation side with respect to the target yaw rate γtgt_atc because of influences of any disturbance may cause possibility that re-deviating behavior is generated in the own vehicle C'_atc at a yaw rate γ'_atc that overshoots toward the deviation side, as denoted by a thin broken line in FIG. 4. Non-limiting examples of the disturbance may include a change in the lane curvature, a change in a transverse gradient of a road, and the driver's steering input.

In this implementation, therefore, the integral control may be restarted at time t3 at which the actual yaw rate crosses the target yaw rate γtgt_atc, in a case where the actual yaw rate makes the transition toward the deviation side with respect to the target yaw rate during the posture decision control. Thus, as illustrated in FIG. 4, it is possible to allow the yaw rate γ_atc of the own vehicle C_atc during the posture decision control to follow the target yaw rate with optimal responsiveness. Hence, it is possible to suppress the re-deviating behavior because of the influences of the disturbance.

Description now moves on to program processing related to the lane deviation prevention control as described above, with reference to flowcharts of FIGS. 5 and 6. The lane deviation prevention control is to be executed by the steering controller 50.

Figure 5:
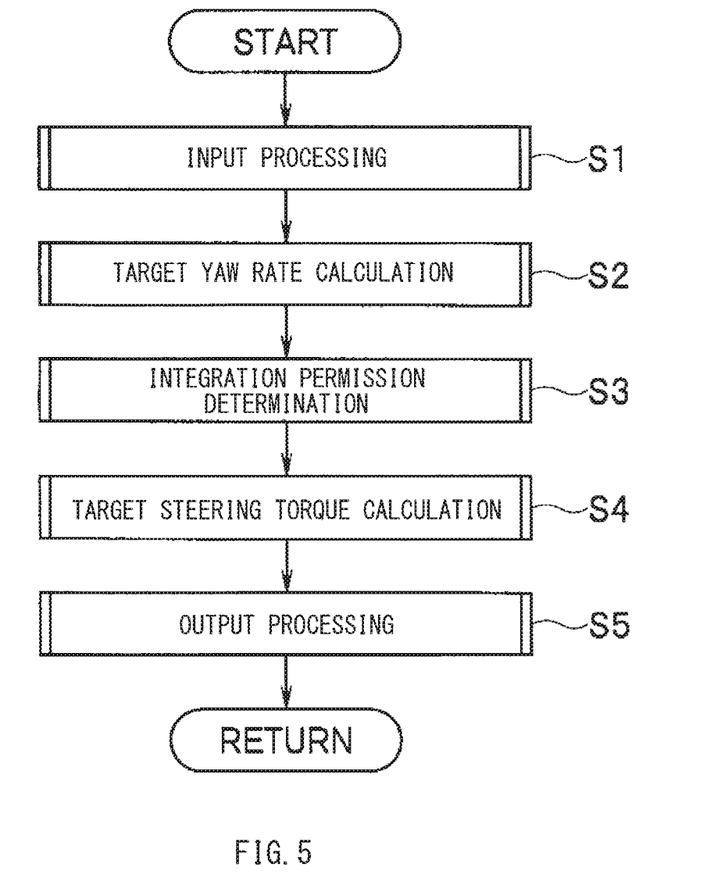
FIG. 5 is a flowchart illustrating an example of a routine of the lane deviation prevention control.

First, referring to the flowchart of FIG. 5, described is a main routine of the lane deviation prevention control. The routine of the lane deviation prevention control may be started in a case where a start condition of the lane deviation prevention control is satisfied. For example, assuming that the lane line on the left side in the traveling direction serves as a lane line as a target of deviation prevention, the start condition may include that the current relative-to-lane yaw angle θyaw satisfies θyaw>0, i.e., that the current relative-to-lane yaw angle θyaw is directed to the direction of deviation, and that the lane deviation estimated time Ttlc is equal to or smaller than the threshold Tth. The lane deviation estimated time Ttlc means the time it takes for the own vehicle to deviate from the lane. The threshold Tth may be decided by the vehicle speed V and the lane curvature κ.

In the routine of the lane deviation prevention control, first, in step S1, the steering controller 50 may perform input processing. The input processing includes inputting, for example, sensor signals, recognition information, and control information. For example, the steering controller 50 may input signals from the sensors and undepicted switches, the recognition information by the camera from the exterior environment recognition device 150, and the control information from other controllers through the communication bus 200. Non-limiting examples of the sensors may include the steering angle sensor 21, the torque sensor 22, the rotation angle sensor 23, the vehicle speed sensor 24, and the yaw rate sensor 25.

Figure 6:
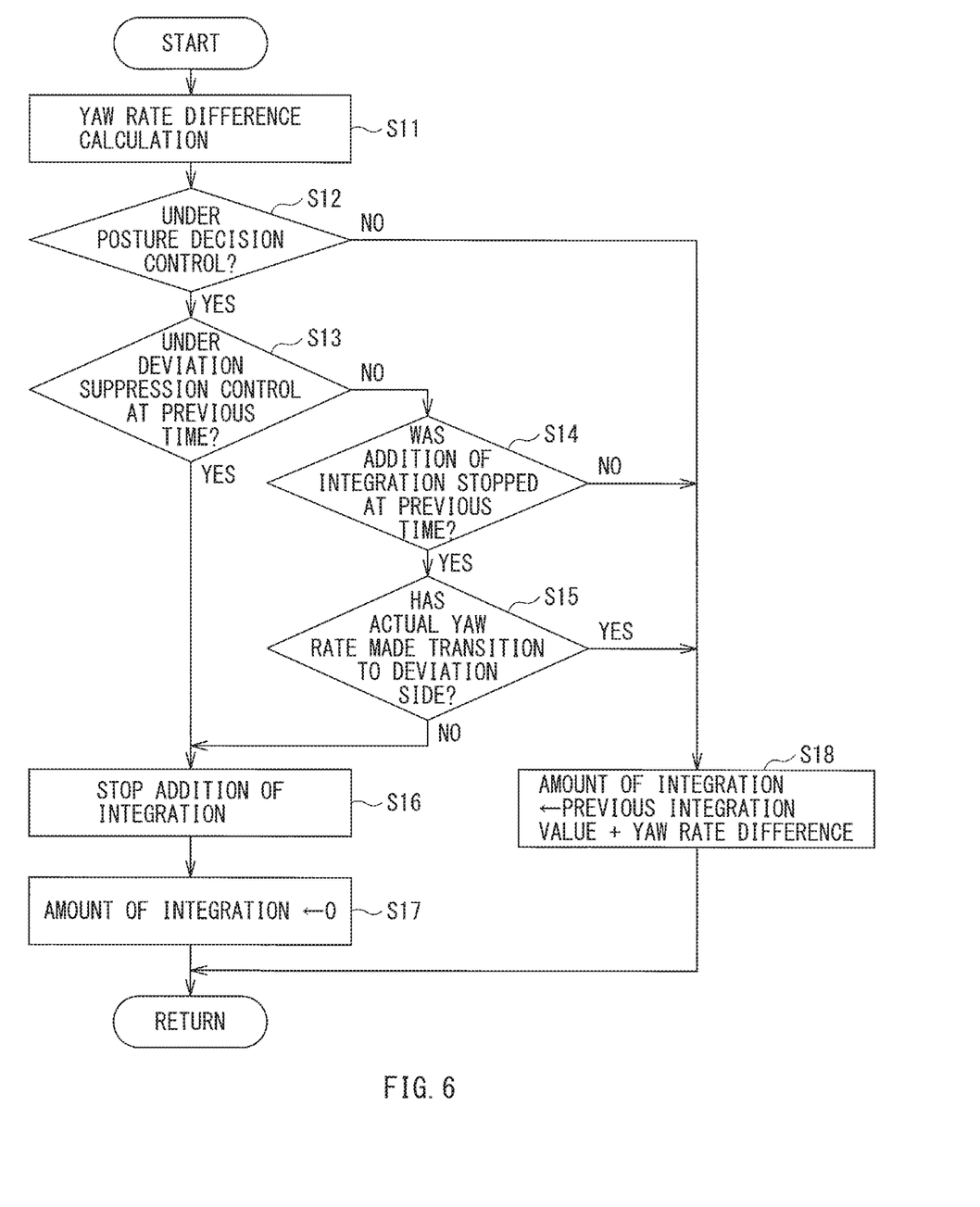
FIG. 6 is a flowchart illustrating an example of a routine of a determination as to whether or not to permit integration.

Thereafter, the routine may proceed to step S2. In step S2, the lane curvature turn target yaw rate γtgt_lane and the deviation prevention behavior generation target yaw rate γtgt_turn may be calculated as the target yaw rate. The routine may proceed to step S3. In step S3, an integration permission determination routine as illustrated in FIG. 6 may be executed. In the integration permission determination routine, a determination may be made as to whether or not to permit the integral control in calculating the feedback torque Tp_fb based on the deviation between the target yaw rate γtgt and the actual yaw rate γ.

In step S4 subsequent to step S3, the target steering torque Tp may be calculated. The target steering torque Tp is provided for achievement of the target yaw rate γtgt. The target steering torque Tp may be the addition of the feedforward torque Tp_ff_lane and Tp_ff_turn, and the feedback torque Tp_fb. The feedforward torque Tp_ff_lane and Tp_ff_turn may be obtained by torque conversion of the lane curvature turn target yaw rate γtgt_lane and the deviation prevention behavior generation target yaw rate γtgt_turn. The feedback torque Tp_fb may be obtained by the feedback control based on the deviation between the target yaw rate γtgt and the actual yaw rate γ. The feedback control may be either the PID control or the PD control, in accordance with a result of the determination in step S3.

Thereafter, the routine may proceed to step S5. In step S5, the target steering torque Tp may be subjected to, for example, rate limit processing and/or friction compensation processing. The rate limit processing may include regulating a speed of change in the torque. The friction compensation processing may include compensating friction in a steering system. Thereafter, output processing may be performed. The output processing may include outputting the target steering torque Tp, as instruction torque, to the motor driver 20 that drives the EPS motor 12.

Description is given next of the integration permission determination routine to be executed in step S3 of the forgoing routine of the lane deviation prevention control, with reference to the flowchart of FIG. 6. In the integration permission determination routine, first, in step S11, a yaw rate difference, i.e., the difference between the target yaw rate γtgt and the actual yaw rate γ, may be calculated. In step S12, a determination may be made as to whether or not the own vehicle is currently under the posture decision control, on the basis of the relative-to-lane yaw angle of the own vehicle with respect to the lane line as the target of deviation prevention.

In a case where the own vehicle is directed toward the direction of deviation with respect to the lane line as the target of deviation prevention, a determination may be made that the own vehicle is not under the posture decision control. The routine may proceed from step S12 to step S18. In step S18, a determination may be made that the integral control is to be permitted. Thus, the latest yaw rate difference may be added to a previous integration value, to update the amount of integration of the integral control. Thus, the processing may return to the main routine.

In step S12, in a case where the own vehicle is parallel to the lane line as the target of deviation prevention, or in a case where the own vehicle is directed inwardly of the lane with respect to the lane line as the target of deviation prevention, a determination may be made that the own vehicle is under the posture decision control. In this case, the routine may proceed from step S12 to step S13. In step S13, a check may be made as to whether or not the own vehicle was under the deviation suppression control at previous time. In other words, a check may be made as to whether or not this is the first transition from the deviation suppression control to the posture decision control.

In a case where this is the first transition from the deviation suppression control to the posture decision control, the routine may proceed from step S13 to step S16. In step S16, a determination may be made that the integral control is not to be permitted, causing a stop of addition of the amount of integration. Thereafter, in step S17, the amount of integration may be reset at zero (0). Thus, the processing may return to the main routine. In this way, the integral control may be stopped, simultaneously with the transition to the posture decision control.

In step S13, in a case where the own vehicle was not under the deviation suppression control but under the posture decision control at the previous time, the routine may proceed from step S13 to step S14. In step S14, a check may be made as to whether or not the addition of the amount of integration was stopped at the previous time. In a case where the addition of the amount of integration was stopped at the previous time, the routine may proceed from step S14 to step S15. In step S15, a check may be made as to whether or not the actual yaw rate γ has made the transition toward the deviation side with respect to the target yaw rate γtgt. In a case with no transition toward the deviation side, the routine may proceed to step S16 as mentioned above, in which the addition of the amount of integration may be stopped. Thereafter, in step S17, the amount of integration may be reset at zero (0). Thus, the processing may return to the main routine.

In step S14, in a case where the addition of the amount of integration was not stopped at the previous time, the routine may proceed from step S14 to step S18 as mentioned above. In step S18, the addition of the amount of integration may be continued, to add the latest yaw rate difference to the previous integration value, and to update the amount of integration. Thus, the processing may return to the main routine. Alternatively, in step S15, in a case where the actual yaw rate γ has made the transition toward the deviation side, the routine may proceed from step S15 to step S18 as mentioned above. In step S18, the addition of the amount of integration may be started, to add the latest yaw rate difference to the previous integration value, and to update the amount of integration. Thus, the processing may return to the main routine.

As described, in this implementation, the determination is made as to whether or not to permit the integral control in the PID control in the lane deviation prevention control, on the basis of the state of the own vehicle with respect to the lane and on the basis of the state of the actual yaw rate with respect to the target yaw rate. This makes it possible to stop the integral control upon the transition from the deviation suppression control to the posture decision control. Hence, it is possible to prevent the deviating behavior from the opposite lane line to the lane line as the target of deviation prevention. Moreover, in a case with high possibility of the re-deviation from the lane line as the target of deviation prevention because of, for example, the occurrence of the disturbance, the integral control may be restarted. Hence, it is possible to prevent the re-deviation from the lane line as the target of deviation prevention.

The steering controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering controller 50 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering controller 50 illustrated in FIG. 1.

Although the technology has been described in terms of exemplary implementations, it is not limited thereto. It should be appreciated that variations may be made in the described implementations by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A lane deviation prevention control device for vehicle, the lane deviation prevention control device comprising:
   a target yaw rate calculator configured to calculate a target yaw rate in a lane deviation prevention control, the lane deviation prevention control including preventing an own vehicle from deviating from a lane on which the own vehicle is traveling;
   a target steering torque calculator configured to calculate target steering torque to be applied to a steering system of the own vehicle, by a feedback control based on at least a deviation between the target yaw rate and an actual yaw rate; and
   an integration permission determiner configured to determine, on a basis of a state of the own vehicle with respect to the lane and on a basis of a state of the actual yaw rate with respect to the target yaw rate, whether or not to permit an integral control in a proportional integral differential control, in executing the feedback control on the target yaw rate by the proportional integral differential control, wherein the integration permission determiner determines not to permit the integral control, causes a stop of the integral control, and resets an amount of integration of the integral control, on a condition that the own vehicle becomes substantially parallel to a direction of extension of the lane.

2. The lane deviation prevention control device for vehicle according to claim 1, wherein the integration permission determiner starts integration of the amount of integration, to bring the feedback control on the target yaw rate to the proportional integral differential control, on a condition that the actual yaw rate makes a transition to deviation side on which deviation is to be expected, with respect to the target yaw rate after the stop of the integral control.

3. The lane deviation prevention control device for vehicle according to claim 1, wherein the target steering torque calculator adds steering torque calculated by a feed-forward control on the target yaw rate to steering torque calculated by the feedback control on the target yaw rate, to calculate the target steering torque.

4. The lane deviation prevention control device for vehicle according to claim 1, wherein the target steering torque calculator adds steering torque calculated by a feedforward control on the target yaw rate to steering torque calculated by the feedback control on the target yaw rate, to calculate the target steering torque.

5. The lane deviation prevention control device for vehicle according to claim 2, wherein the target steering torque calculator adds steering torque calculated by a feedforward control on the target yaw rate to steering torque calculated by the feedback control on the target yaw rate, to calculate the target steering torque.

6. A lane deviation prevention control device for vehicle, the lane deviation prevention control device comprising circuitry configured to calculate a target yaw rate in a lane deviation prevention control, the lane deviation prevention control including preventing an own vehicle from deviating from a lane on which the own vehicle is traveling, calculate target steering torque to be applied to a steering system of the own vehicle, by a feedback control based on at least a deviation between the target yaw rate and an actual yaw rate, and determine, on a basis of a state of the own vehicle with respect to the lane and on a basis of a state of the actual yaw rate with respect to the target yaw rate, whether or not to permit an integral control in a proportional integral differential control, in executing the feedback control on the target yaw rate by the proportional integral differential control, wherein the integration permission determiner determines not to permit the integral control, causes a stop of the integral control, and resets an amount of integration of the integral control, on a control that the own vehicle becomes substantially parallel to a direction of extension of the lane.

* * * * *